(12) United States Patent
Burke et al.

(10) Patent No.: US 7,930,625 B2
(45) Date of Patent: Apr. 19, 2011

(54) METHOD AND SYSTEM FOR DESIGNING AND IMPLEMENTING SHAPES IN A SOFTWARE MODULE

(75) Inventors: Fergal Burke, Kirkland, WA (US); Abraham Mathew, Mountlake Terrace, WA (US); Heidi McAllister, Brier, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 11/625,061

(22) Filed: Jan. 19, 2007

(65) Prior Publication Data

US 2007/0118830 A1 May 24, 2007

Related U.S. Application Data

(63) Continuation of application No. 10/152,269, filed on May 21, 2002, now Pat. No. 7,185,313.

(51) Int. Cl.
*G06F 9/44* (2006.01)

(52) U.S. Cl. .................................... 715/211; 717/104

(58) Field of Classification Search ............ 715/211; 345/440, 441; 717/104
See application file for complete search history.

(56) References Cited

U.S. PATENT DOCUMENTS

| | | | |
|---|---|---|---|
| 4,813,013 A | 3/1989 | Dunn | |
| 5,070,534 A * | 12/1991 | Lascelles et al. | 715/764 |
| 5,481,665 A | 1/1996 | Okada et al. | |
| 5,552,995 A * | 9/1996 | Sebastian | 700/97 |
| 5,588,108 A | 12/1996 | Kumar et al. | |
| 5,603,034 A | 2/1997 | Swanson | |
| 5,613,122 A | 3/1997 | Burnard et al. | |
| 5,796,986 A * | 8/1998 | Fuller | 716/137 |
| 5,855,009 A * | 12/1998 | Garcia et al. | 706/45 |
| 5,875,331 A | 2/1999 | Lindsey | |
| 5,883,639 A | 3/1999 | Walton et al. | |
| 5,978,582 A * | 11/1999 | McDonald et al. | 717/104 |
| 6,182,024 B1 * | 1/2001 | Gangopadhyay et al. | 703/22 |
| 6,215,502 B1 | 4/2001 | Ferguson | |
| 6,370,681 B1 * | 4/2002 | Dellarocas et al. | 717/110 |
| 6,377,263 B1 | 4/2002 | Falacara et al. | |
| 6,512,519 B1 * | 1/2003 | Arsenault et al. | 345/441 |
| 6,545,676 B1 | 4/2003 | Ryan et al. | |
| 6,760,693 B1 | 7/2004 | Singh et al. | |
| 6,889,113 B2 * | 5/2005 | Tasker et al. | 700/180 |

(Continued)

OTHER PUBLICATIONS

Hoffman et al. "Distributed Maintenance of Multiple Product Views", Department of Computer Sciences, Purdue Universit, Nov. 11, 1999.*

(Continued)

*Primary Examiner* — Cesar B Paula
*Assistant Examiner* — Ahamed I Nazar
(74) *Attorney, Agent, or Firm* — Perkins Coie LLP

(57) ABSTRACT

A computer-implemented method and system for designing shapes for a software module. Drawing software modules typically provide master shapes that are used as templates in creating drawings. The function of master shapes is generally controlled by behaviors. The invention improves upon existing approaches to designing master shapes by providing a uniform procedure for creating master shapes. The present invention supports the creation of a uniform set of behaviors that are stored independently of the master shapes. The stored behaviors are the preferred methods for controlling the functions of the master shapes. Individual stored behaviors can be selected and used to create the characteristics of a master shape. Using a uniform set of stored behaviors that are implemented in a preferred manner facilitates the management and maintenance of the behaviors and the master shapes they control.

18 Claims, 13 Drawing Sheets

U.S. PATENT DOCUMENTS

| | | | |
|---|---|---|---|
| 6,904,393 B2 * | 6/2005 | Schwalb et al. | 703/1 |
| 6,999,102 B2 * | 2/2006 | Felser et al. | 345/619 |
| 2002/0035408 A1 * | 3/2002 | Smith | 700/97 |
| 2002/0095231 A1 * | 7/2002 | Yu et al. | 700/97 |
| 2002/0169658 A1 * | 11/2002 | Adler | 705/10 |
| 2003/0200062 A1 * | 10/2003 | Dessureault et al. | 703/1 |

OTHER PUBLICATIONS

Using Prototypical Objects to Implement Shared Behavior in Object Oriented Systems, by Henry Lieberman, Artificial Intelligence Laboratory, Massachusetts Institute of Technology, Cambridge, Mass. 02139 USA, pp. 1-12.*

Integrating an Energy Evaluation Module With a CAD Program: A Feasibility Study, By Meacham et al., u.s. Department of Energy Contract No. DE-FC03-89SF17960, Dec. 1991, pp. 1-102.*

Chang, Shih-Fu, et al., "Transform Coding of Arbitrarily-Shaped Image Segments," Proceedings of the First ACM International Conference on Multimedia, Sep. 1993.

Dowhal, Danny, "A Seven-Dimensional Approach to Graphics," ACM SIGDOC Asterisk Journal of Computer Documentation, Nov. 1997.

Helm, Richard, et al., "Contracts: Specifying Behavioral Compositions in Object-Oriented Systems," ACM, Oct. 1990.

Pham, Binh, "Shape Specification in Design Using Fuzzy Logic," IEEE, 1999.

* cited by examiner

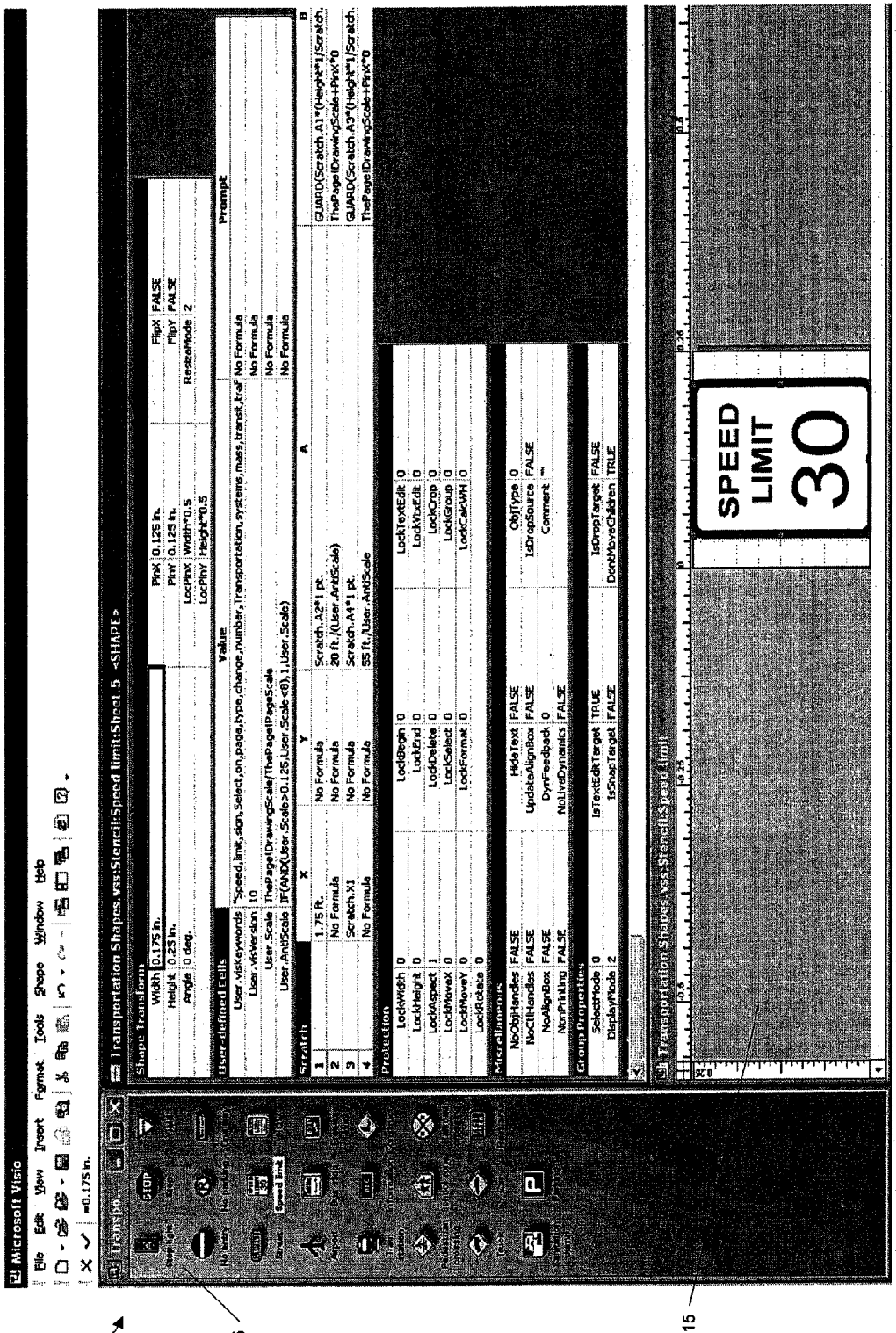
Prior Art   FIG. 3A

Specification of Shape

Translate Shapes

```
Last Validation Run On: 3/4/2002 8:13:21 AM

Validating ...
Car 4
  Behavior 'Width' is invalid.  Expected value is '.5 in.'
  Behavior 'Height' is invalid.  Expected value is '.5 in.'
  Validation failed
Car 3
  Master is valid Validation completed - 3 error(s)
```

Validation | Specification | Validation | Output

FIG. 9

METHOD AND SYSTEM FOR DESIGNING AND IMPLEMENTING SHAPES IN A SOFTWARE MODULE

CROSS-REFERENCE TO RELATED APPLICATION(S)

This application is a continuation of U.S. patent application Ser. No. 10/152,269, filed May 21, 2002 entitled "METHOD AND SYSTEM FOR DESIGNING AND IMPLEMENTING SHAPES IN A SOFTWARE MODULE," which application is hereby incorporated by reference in its entirety.

TECHNICAL FIELD

The present invention is generally directed to a software module used for drawing diagrams. More specifically, the present invention provides a method and system for efficiently specifying, designing, creating, testing, and maintaining master shapes for use with a software module, such as a drawing software module.

BACKGROUND OF THE INVENTION

Drawing software is commonly used in a wide variety of disciplines today to create objects on an electronic page and to show how those objects are interrelated. Drawing software is a significant improvement over traditional hard copy drawings because the electronic format facilitates storage, editing, and recreation of the drawings. Conventional drawing software modules typically are available with pre-designed libraries of master shapes. Master shapes are the building blocks on which more complex drawings and diagrams are created. Master shapes often have logic associated with them that controls how they function and how they can be manipulated. For example, a library may have master shapes comprising a rectangle and diamond that are typically used in creating a flow chart. A user may be able to manipulate the size of the master shape or control text associated with the master shape. Other libraries can be designed with master shapes commonly used in a particular field, such as chemistry. As drawing software modules develop in sophistication, libraries of master shapes can be created for a variety of fields.

The conventional process for creating libraries of master shapes generally begins with identifying and specifying the master shapes that are desired. A developer creates the master shapes based on prior knowledge of the shape requirements or based on a specification that a designer may have created. Typically, the drawing software module itself is the development environment for creating the master shapes. Conventional drawing software modules are generally designed with a variety of functions for creating and drawing objects on the electronic page. As a result, in most instances, there are a variety of ways and functions that a master shape can be created within the drawing software module. The way in which a master shape is created is essentially the choice of the developer. Once the new master shapes are developed, they are tested by another person to ensure they work properly within the drawing software module. If they do work properly they will be implemented in a library of master shapes within the drawing software module. In the future, further maintenance and updating of the master shapes may be required.

One problem with the conventional approach to creating and implementing master shapes is the ad hoc approach in which they are designed. Specifically, most master shapes can be implemented by designers in a variety of ways using the drawing software module. This inherent flexibility is useful for ultimate users of the drawing software module, but from a software design perspective, it creates many difficulties. First, the flexibility of the drawing software module makes it difficult to precisely specify new shapes for development. Because new master shapes can be created in a variety of ways, there is no uniform approach to specifying their development. Second, the ad hoc approach to designing new master shapes makes it difficult to test them and the way they interact with the existing software. Conventional drawing software modules typically contain thousands of master shapes. Third, the flexibility of most drawing software modules makes it difficult to maintain the master shapes over time within the drawing software module. For example, if a set of master shapes needs to be modified or updated for a later version, the programmer responsible for modifying the master shapes must sift through the work of previous developers that probably created the master shapes in a variety of different ways. Furthermore, developers often need to apply the same modifications to many shapes, such as translation for local languages, which can be a tedious and error prone task because changes are made to each master shape individually.

In view of the foregoing, there is a need in the art to create a uniform approach to master shape development for drawing software modules. Specifically, because the drawing software module itself is typically the development environment, there is a need for a uniform platform for use in creating master shapes. There is also a need to be able to identify common behaviors among master shapes and to store those common behaviors for use in specifying and implementing other master shapes. Finally, there is a further need to be able to easily test and maintain master shapes in a simple and efficient manner.

SUMMARY OF THE INVENTION

The present invention is generally directed to a method and system for creating master shapes for a software program, such as a drawing software module. The present invention improves upon existing approaches by creating a set of common attributes, called behaviors, among various master shapes. The behaviors are stored independently from particular shapes and can be used to specify and create new master shapes. By using the common attributes, master shapes can be created in a more uniform and systematic way. The common attributes also facilitate simpler testing and modification of shapes as these functions can be performed at the attribute level as opposed to on each individual master shape.

In one aspect, the invention comprises a method for creating a master shape for a software module having a drawing feature. Once a desired shape is identified, a designer can create a specification describing the characteristics of the shape. The designer can choose from predefined behaviors stored in a library of behaviors, or can create her own behaviors, for use in creating the specification of the master shape. A base master specification comprises a set of behaviors and implemented behavior values that are shared among a plurality of master shapes. A designer can associate a master shape specification with a base master specification, however, behaviors and implemented behavior values can also be set to take precedence over the associated base master specification. The master shape specification comprises the list of behaviors and their implemented behavior values of the master specification combined with those of any associated base master specification and any override settings. Once the specification is created, a developer can use it to create the master shape. The master shape is typically created within the drawing software module and information in the specification is applied to the master shape. When the developer completes the master shape it can be stored for testing and ultimate use in the drawing software module.

In another aspect, the invention comprises a method for creating master shapes where portions of the development process can be divided up and assigned to other developers. In this aspect, once a desired shape is identified, the specification and development processes can be performed by the primary designer or by an outside developer. The behaviors and behavior implementation values of the master shape are selected and stored as part of the specification. If an outside developer is performing the development, she can refer to the specification stored in a database and use it in creating the master shape. Developing a master shape typically involves using the drawing software module to draw the graphical elements followed by applying the specification to the implemented master shape. Once the shape is developed and the specification applied, the developer can check the master shape back in to the database and verify that it functions according to the specification.

In yet another aspect, the invention comprises a system for creating master shapes for a drawing software module. The system comprises a database operable for storing behaviors and implemented behavior values that define master shapes. Using the behaviors and behavior values, a designer can create a specification that describes a master shape. A developer can use the specification to create the master shape, typically, within the drawing software module. The behaviors and behavior values control how the master shape appears and functions. The developer can also create a specification for a library of master shapes and associate related master shapes with the library specification. The system can also be accessed by an outside developer. The outside developer can create the specification or use a specification created by another to implement the master shape. The system facilitates maintenance in that changes can be made to a master shape in a consistent and automated manner by modifying the master shape specification or the base master specification. Changes to the base master specification are applied to all master shapes associated with it.

These and other aspects of the invention will be described in the detailed description in connection with the drawing set and claim set.

BRIEF DESCRIPTION OF THE DRAWINGS

FIG. 3A is a representative display screen illustrating the conventional method for developing master shapes as known in the prior art.

FIG. 9 is a representative display screen illustrating the results of a validation test of a master shape in accordance with an embodiment of the present invention.

DETAILED DESCRIPTION OF THE EXEMPLARY EMBODIMENTS

Figure 1:
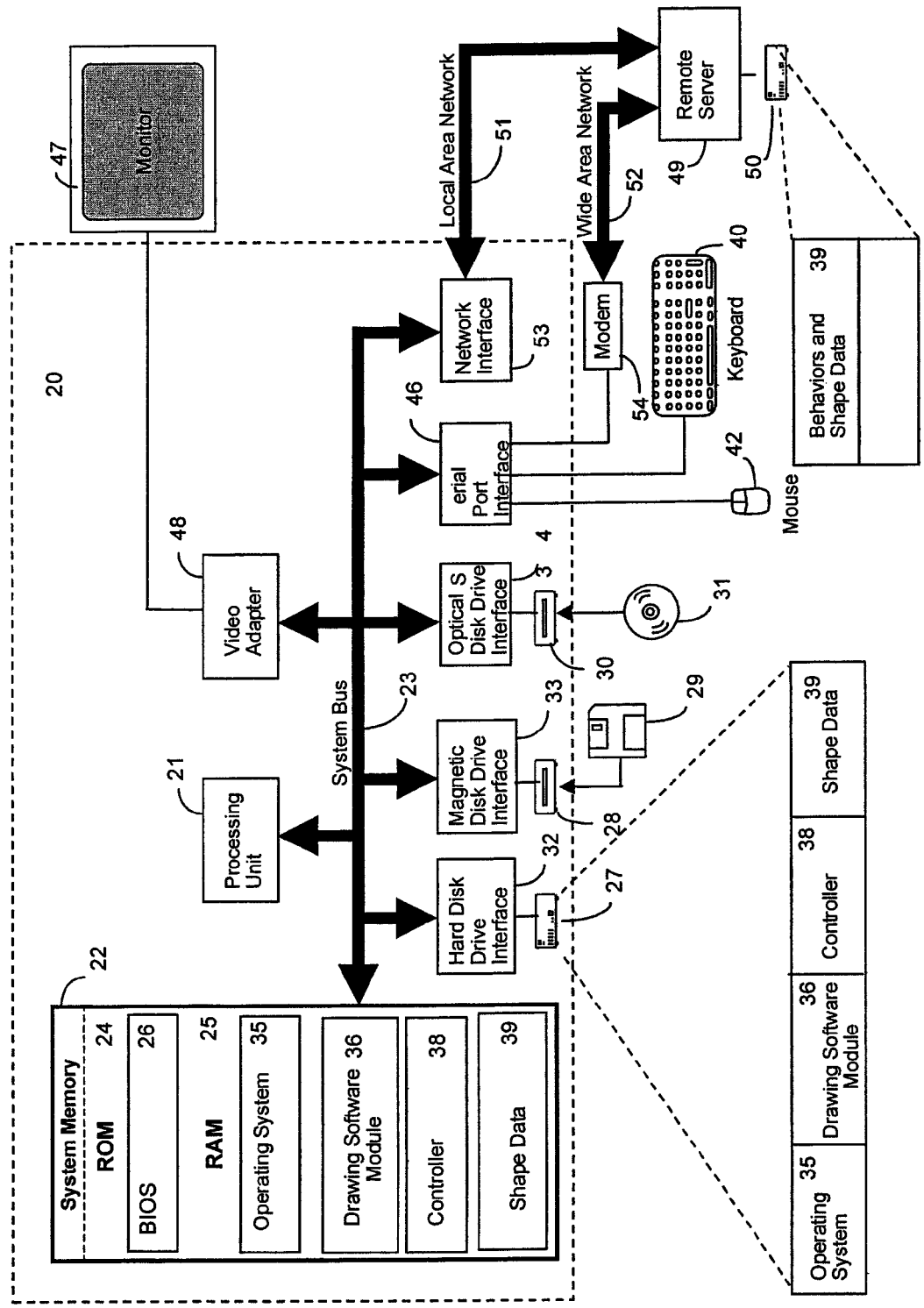
FIG. 1 is a functional block diagram illustrating the operating environment for an exemplary embodiment of the present invention.

The present invention provides an improved approach to creating master shapes for software modules having a drawing feature. Specifically, the present invention takes advantage of the common attributes and characteristics used in many master shapes. These common attributes and characteristics are stored as behaviors in a database and one or more behaviors can be selected for use by a developer to create a master shape. Each stored behavior is the preferred method for implementing a particular characteristic. By using a consistent body of stored behaviors, master shapes are created in a more uniform and consistent manner. The stored behaviors also exist independently of the master shapes. Maintaining the master shape behaviors as a separately stored library makes it easier to test, modify, and update master shapes. Instead of having to work with each master shape on an individual basis, a developer can modify a single stored behavior and the change will be implemented for all master shapes that use the particular behavior.

Although the exemplary embodiments will be generally described in the context of a software module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended display screens and flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionally of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 20 suitable for supporting the operation of the preferred embodiment of the present invention. As shown in FIG. 1, the personal computer 20 operates in a networked environment with logical connections to a remote computer 49. The logical connections between the personal computer 20 and the remote computer 49 are represented by a local area network 51 and a wide area network 52. Those of ordinary skill in the art will recognize that in this client/server configuration, the remote computer 49 may function as a file server or computer server.

The personal computer 20 includes a processing unit 21, such as "PENTIUM" microprocessors manufactured by Intel Corporation of Santa Clara, Calif. The personal computer also includes system memory 22, including read only memory (ROM) 24 and random access memory (RAM) 25, which is connected to the processor 21 by a system bus 23. The preferred computer 20 utilizes a BIOS 26, which is stored in ROM 24. Those skilled in the art will recognize that the BIOS 26 is a set of basic routines that helps to transfer information between elements within the personal computer 20. Those skilled in the art will also appreciate that the present invention may be implemented on computers having other architectures, such as computers that do not use a BIOS, and those that utilize other microprocessors.

Within the personal computer 20, a local hard disk drive 27 is connected to the system bus 23 via a hard disk drive interface 32. A magnetic disk drive 28, which is used to read or write a floppy disk 29, is connected to the system bus 23 via a magnetic disk drive interface 33. An optical drive 30, such as a CD-ROM or DVD drive, which is used to read an optical disk 31, is connected to the system bus 23 via an optical disk drive interface 34. A user enters commands and information into the personal computer 20 by using input devices, such as a keyboard 40 and/or pointing device, such as a mouse 42, which are connected to the system bus 23 via a serial port interface 46. Other types of pointing devices (not shown in FIG. 1) include track pads, track balls, pens, head trackers, data gloves and other devices suitable for positioning a cursor on a computer monitor 47. The monitor 47 or other kind of display device is connected to the system bus 23 via a video adapter 48.

The remote computer 49 in this networked environment is connected to a remote memory storage device 50. This remote memory storage device 50 is typically a large capacity device such as a hard disk drive, CD-ROM or DVD drive, magneto-optical drive or the like. Those skilled in the art will understand that program modules, such as an application program module 36, are provided to the remote computer 49 via computer-readable media. The personal computer 20 is connected to the remote computer 49 by a network interface 53, which is used to communicate over the local area network 51.

In an alternative embodiment, the personal computer 20 is also connected to the remote computer 49 by a modem 54, which is used to communicate over the wide area network 52, such as the Internet. The modem 54 is connected to the system bus 23 via the serial port interface 46. The modem 54 also can be connected to the public switched telephone network (PSTN) or community antenna television (CATV) network. Although illustrated in FIG. 1 as external to the personal computer 20, those of ordinary skill in the art can recognize that the modem 54 may also be internal to the personal computer 20, thus communicating directly via the system bus 23. It is important to note that connection to the remote computer 49 via both the local area network 51 and the wide area network 52 is not required, but merely illustrates alternative methods of providing a communication path between the personal computer 20 and the remote computer 49.

Although other internal components of the personal computer 20 are not shown, those of ordinary skill in the art will appreciate that such components and the interconnection between them are well known. Accordingly, additional details concerning the internal construction of the personal computer 20 need not be disclosed in connection with the present invention.

Those skilled in the art will understand that program modules, such as an operating system 35 and an application program module 36, and data are provided to the personal computer 20 via computer-readable media. In the preferred computer, the computer-readable media include the local or remote memory storage devices, which may include the local hard disk drive 27, floppy disk 29, CD-ROM or DVD 31, RAM 25, ROM 24, and the remote memory storage device 50. In the preferred personal computer 20, the local hard disk drive 27 is used to store data and programs.

Figure 2:
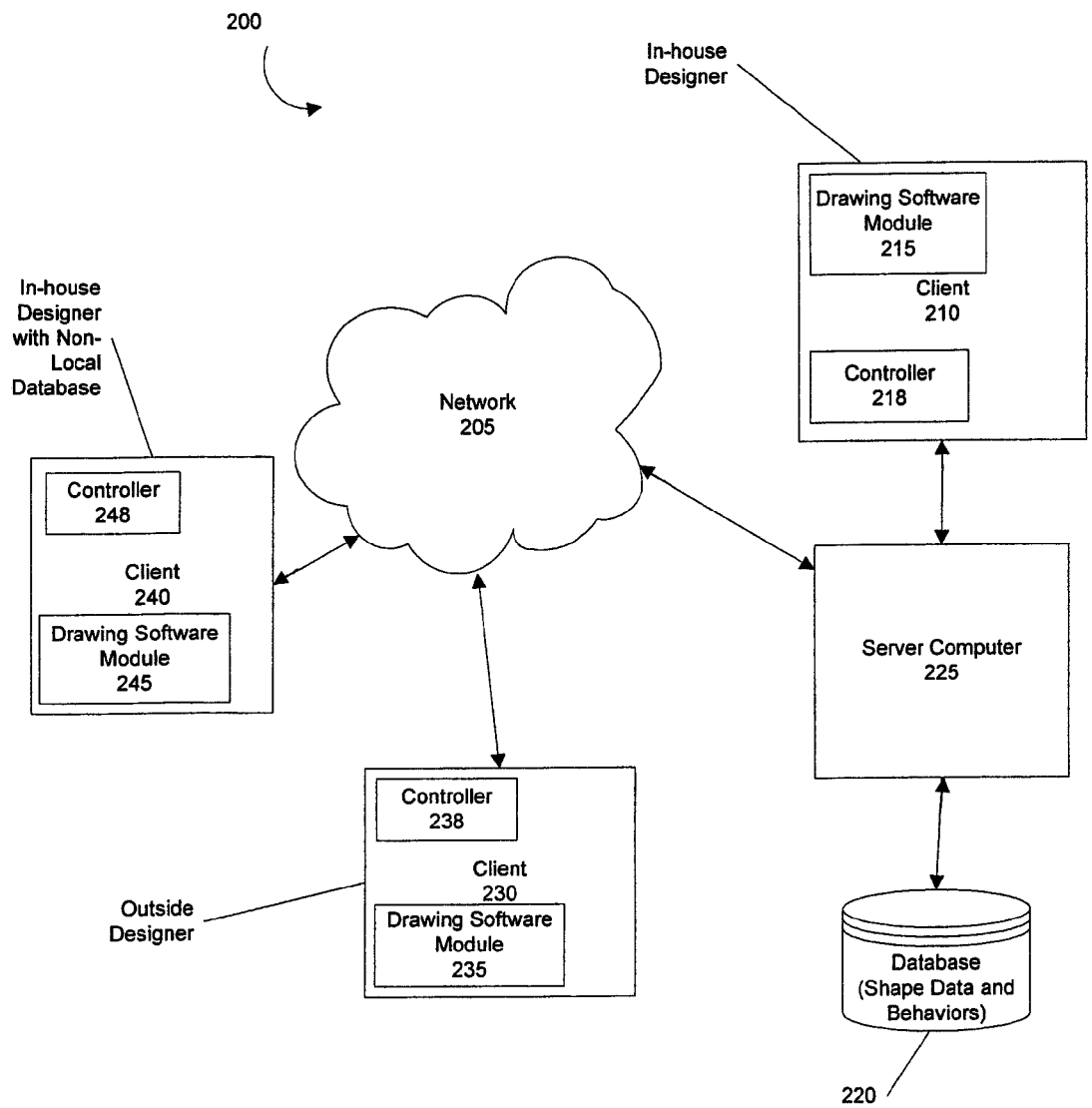
FIG. 2 is a functional block diagram illustrating an architecture for implementing an exemplary embodiment of the present invention.

Referring to FIG. 2, an exemplary architecture is illustrated for implementing the present invention. The exemplary architecture shown in FIG. 2 demonstrates three different methods for creating master shapes for a drawing software module. One method involves design and development of a master shape in-house using a system that is not connected to a network. Another method involves design and development of a master shape in-house using a system that is connected to a network and accessing a database stored on a network server. A third method supports the design and development of a master shape by outside designers and developers who are connected to a network and access a database stored on a networked server.

In the first method, an exemplary architecture comprises an in-house client 210 coupled to a server 225 and a database 220. Alternatively, the server computer could be eliminated in this exemplary architecture. The database contains a collection of pre-defined behaviors which can be used in varying combinations to create different master shapes. The database can also store specification and master shape data created during the development process. A drawing software module 215 operating on the client 210 typically provides the development environment for 5 creating a master shape. A controller 218, also operating on the client 210, allows the drawing software module 215 to interact with and manage the behaviors stored in the database 220. A designer using the drawing software module 215 can access the behaviors in the database 220 to create a specification for a master shape. The designer, or another developer, using the drawing software module and the specification can create the master shape and associate particular behaviors with the master shape.

The second method is a relatively minor modification to the first method. The second method for creating master shapes allows an in-house designer operating client 240 to access shape data and behaviors via network 205. In this way, an in-house designer can create a master shape remotely and store the master shape in the database 220 for future testing and use in the drawing software module.

In the third method for creating master shapes, an outside source can complete portions of the shape development process. For example, an outside developer operating client 230 can access the database 220 via network 205 and server 225. The outside developer can retrieve a specification of a desired shape created by an in-house designer and use the specification and drawing software module 235 to create a master shape. When finished, the outside developer can check the master shape into the database 220 for subsequent testing and implementation in the drawing software module. In another embodiment an outside developer can create the specification upon being given information about the desired master shape. The system employed by the present invention facilitates distribution of tasks in the development process while maintaining uniformity in the design and development of the master shapes.

FIG. 3A is a representative screen display 300 illustrating the conventional approach to developing shapes as known in the prior art. FIG. 3A demonstrates the development of a master shape called "Speed limit" for a transportation stencil in a drawing software module. The transportation stencil 305 contains a variety of master shapes that would be useful in creating a drawing relating to transportation, such as a map. The traditional approach to shape development involves designing the master shape, in this case the speed limit sign, using a shape sheet 310 and the capabilities of the drawing software module itself. The parameters set in the shape sheet control the appearance and functions of the master shape. Only one shape sheet 310 is shown in FIG. 3A, but a single master shape may have several shape sheets that define its behavior. Although all of the master shapes in the stencil 305 are different, there are many similarities between the master shapes such as shape, dimensions, and associated text. The flexibility of the drawing software module and the shape sheet 310 make it possible for developers to create the master shapes shown in stencil 305 in a variety of different ways. This flexibility in the prior art method of developing shapes also produces many problems for designers. The approach of the present invention is to eliminate much of the flexibility in the development process so that developers can capture the efficiencies present in the similarities between master shapes. Taking advantage of these similarities also produces a resulting product with master shapes that are designed more uniformly and thus, are easier to manage.

Figure 3B:
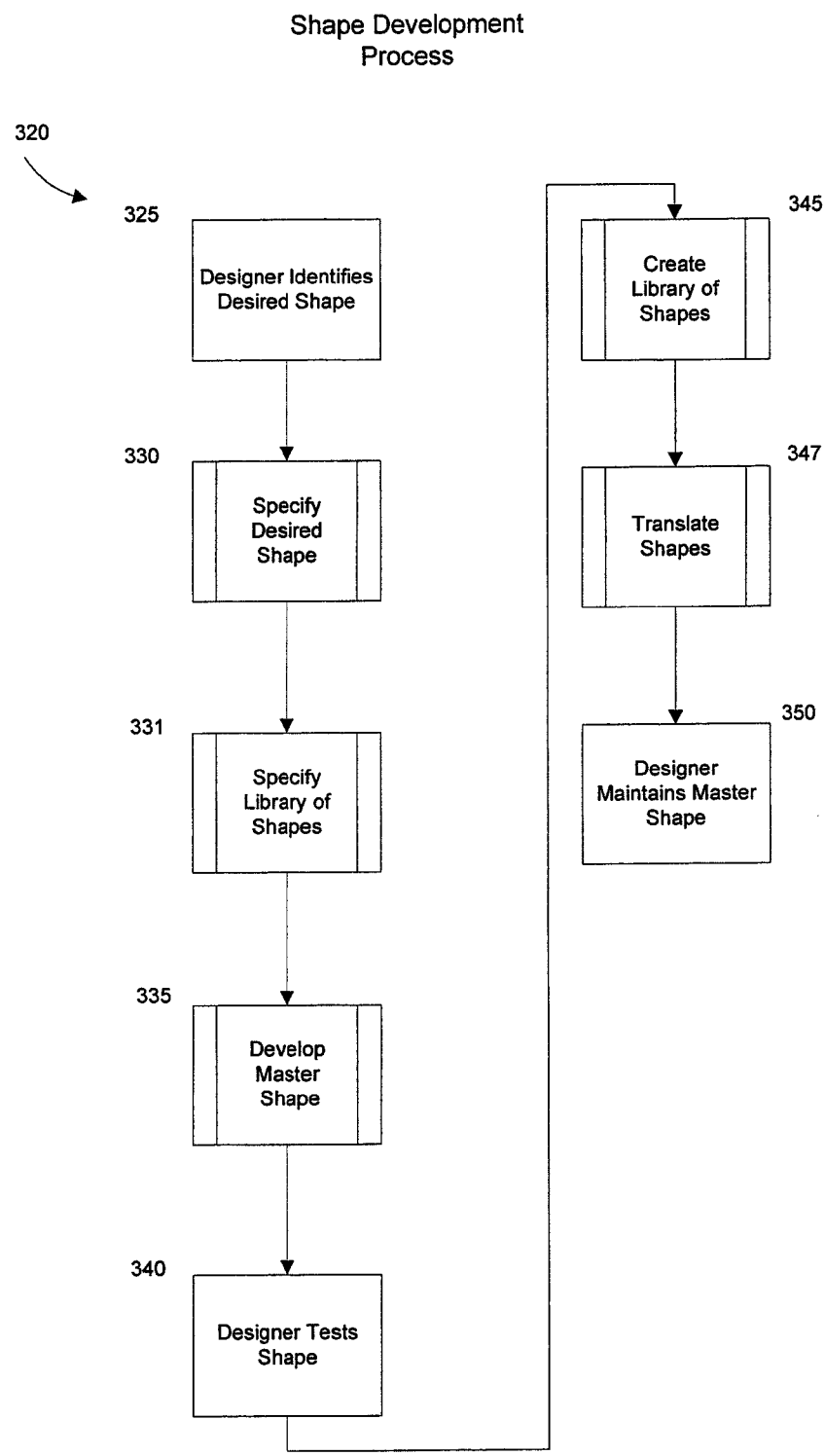
FIG. 3B is a logic flow diagram illustrating an overview of an exemplary process for developing master shapes for a drawing software module in accordance with an embodiment of the present invention.

Referring to FIG. 3B, an exemplary process 320 is illustrated for developing shapes for use in a drawing software module. The development of shapes for a drawing software module is often a collaborative approach involving the efforts of a group of people on a design team and in some cases, the work of software engineers from outside the design team. Although the foregoing embodiments identify a single designer, developer, or tester as performing the work, in many instances this designation includes the work of several people. Furthermore, in alternative embodiments of the invention, some of the foregoing steps may occur in a different order or may be repeated. Beginning with step 325 in the exemplary process 320, a designer first identifies the desired shapes for the drawing software module. The desired shapes may pertain to a specific practical application such as creating business process flow diagrams or chemical structures. In step 330, the designer must identify and specify the particular behaviors of the desired shapes. The specification defines the appearance and function of the master shape. An exemplary process for specifying a master shape is described in greater detail in connection with FIG. 4 below.

In step 331, the developer specifies a library to which the desired shape can belong. Libraries of shapes are typically created as a method of organizing groups of related shapes and presenting them to a user of the software module. The specification of a library is described in greater detail in connection with FIG. 6. In step 335, a developer creates the master shape using the information describing the desired shape in the specification. The developer typically creates the master shape within the drawing software module. The development method of the present invention improves upon the prior art in that the master shape is created by selecting and applying behaviors stored in the database 220. An exemplary process for developing shapes will be discussed in greater detail in connection with FIG. 7A. In step 340, the developed master shape is tested to determine whether it functions properly within the drawing software module. The testing process also ensures that the function of the master shape is integrated with the other features and shapes of the drawing software module.

The developer creates a library of shapes for use by a user in step 345. Although a library of shapes can exist in a variety of forms, one common example is a stencil of collected shapes that are available to the user on a tool bar. Creation of the library of shapes is described in greater detail in FIG. 7B and the accompanying text. In step 347, the developer can also perform a translation process for implementing the master shape in other languages. The translation process is described in greater detail in FIG. 7C.

The final step 350 of the exemplary process 320 is the maintenance of master shapes by the designer. The maintenance of master shapes is an ongoing process whereby they may be updated or enhanced as the drawing software module evolves. The maintenance of master shapes is greatly facilitated by the exemplary shape development process described herein. According to the present invention, a designer can modify one or more behaviors or behavior values as defined in the specification stored in the database 220 to affect each master shape that incorporates that behavior or behavior value. This approach is more efficient than maintaining each master shape on an individual basis. Creating a cohesive and uniform approach to developing shapes within a drawing software module makes the maintenance of those shapes a simpler task. The shape development process 320 is described as designers and developers performing interactive tasks. However, in an alternative embodiment the invention can be adapted such that the process 320 is automated and functions without human interaction.

Figure 4:
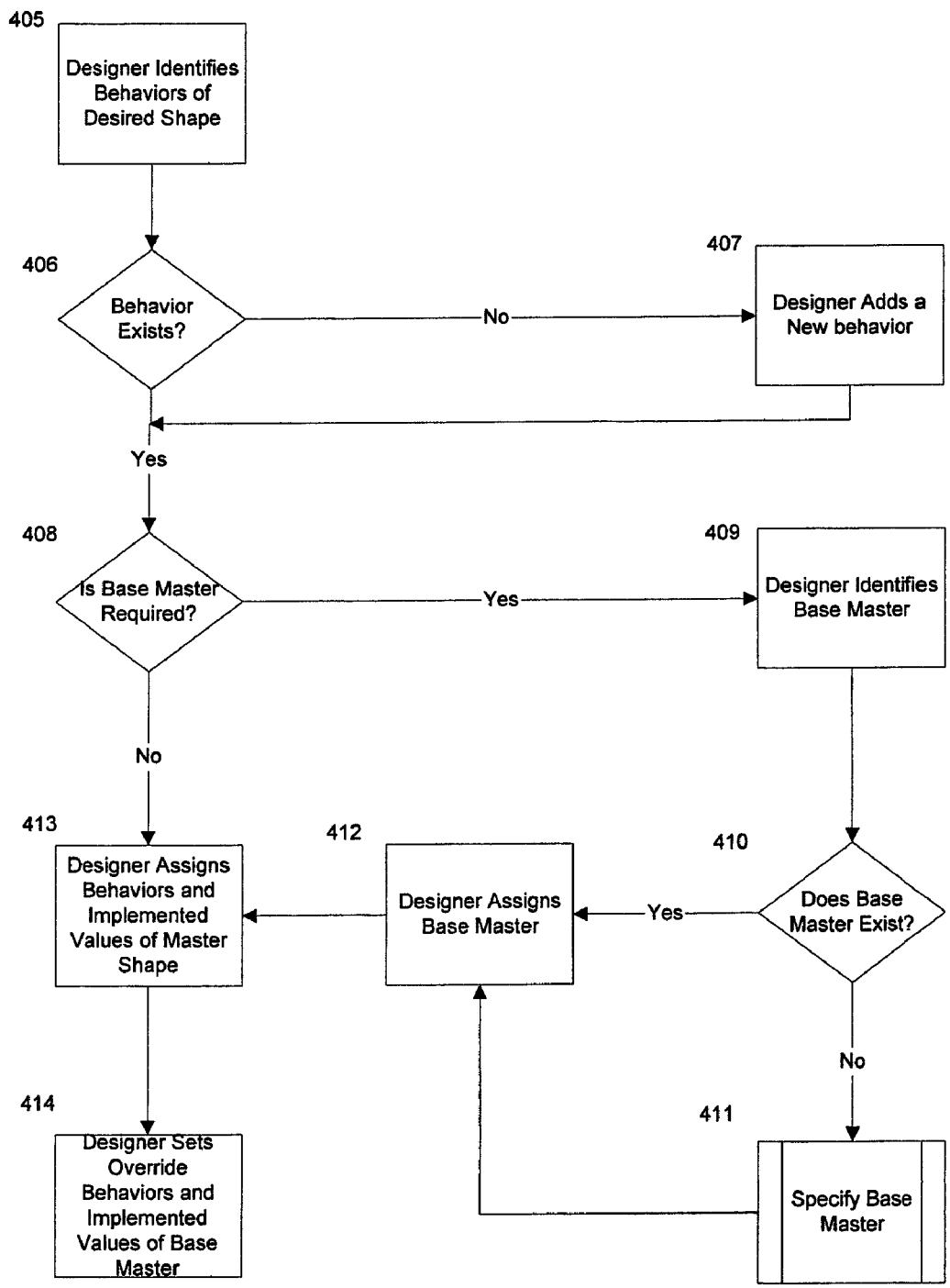
FIG. 4 is a logic flow diagram illustrating an exemplary process for a designer to specify a master shape in accordance with an embodiment of the present invention.

Referring to FIG. 4, an exemplary process for the specification of shapes as referred to in step 330 is illustrated. The exemplary process 330 can be performed by any of the various designers represented in FIG. 2. In the exemplary specification process 330 shown in FIG. 4, the designer begins by identifying behaviors of the desired shape in step 405. Examples of behaviors that may be identified in a desired shape include providing the user with the ability to specify the size of a shape, its color, or the centering of text within the shape. Many of the behaviors identified by the designer in step 405 may already exist as pre-determined behaviors stored in the database 220.

If the desired behavior does not already exist then the designer may create a new behavior in step 407. A new behavior can be defined by the designer or developer by either creating a file conforming to a prescribed textual format or by creating a computer executable function conforming to a set of prescribed rules. In step 408, the designer determines if a base master is required. If a base master is required, then in step 409, the designer must identify the base master specification which encapsulates the desired behaviors common to a plurality of master shapes. If the desired base master does not already exist, then the designer must specify a new base master in step 411. The process for specifying a base master is described in greater detail in FIG. 5. Once the base master exists the designer assigns the base master to the master shape in step 412. In the example shown in FIG. 8, the width and height of all master shapes within the "vehicles" base master are set to an implemented behavior value of 0.5 inches in the specification window 810. The tree directory in window 805 shows all of the master shapes that are linked to the vehicles base master and share the behaviors of the vehicles base master. In comparison, all of the master shapes listed under the "roads" heading in window 805 inherit the same behaviors as the roads base master.

Figure 8:
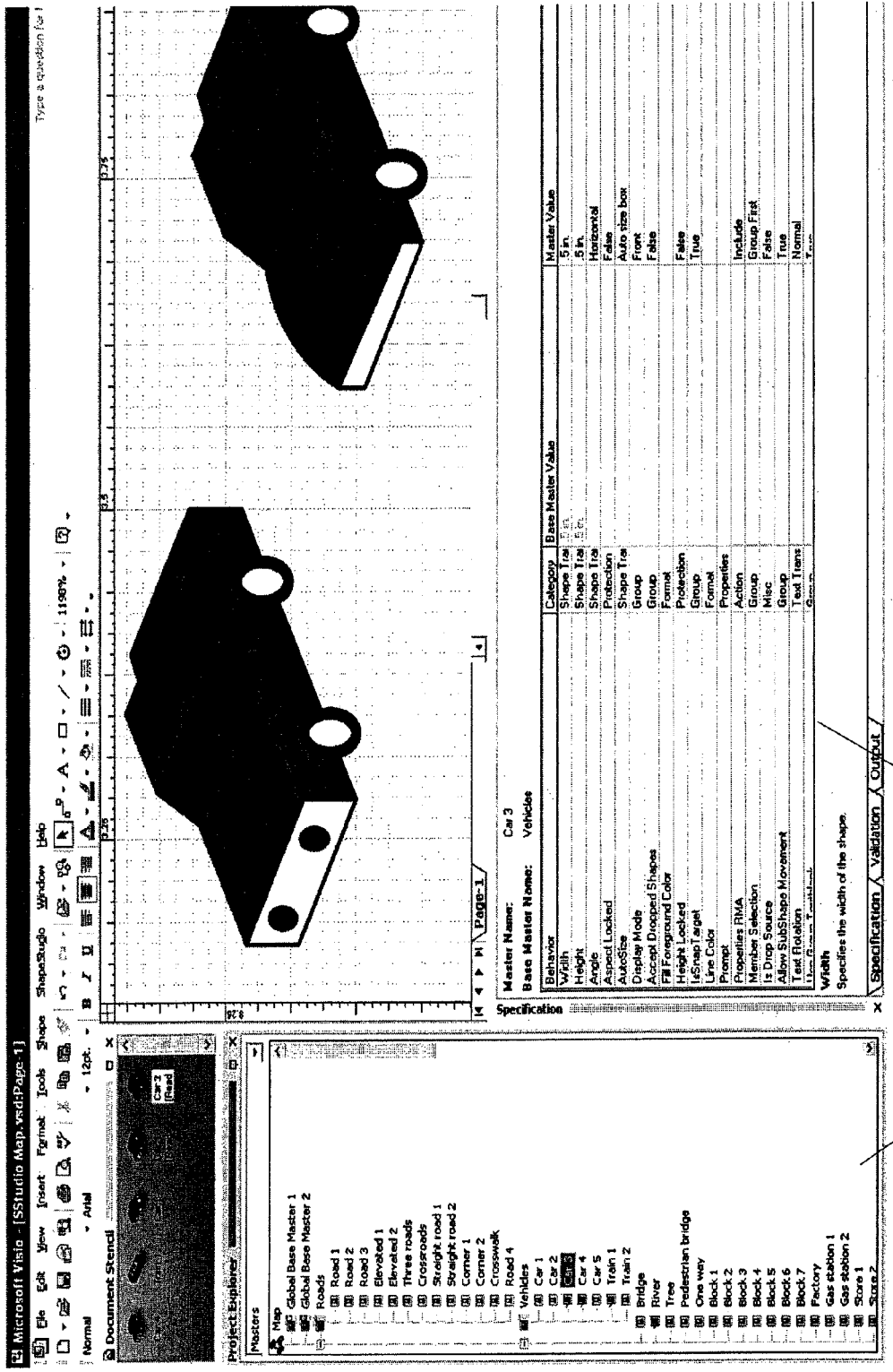
FIG. 8 is a representative display screen illustrating behaviors that can be associated with a master shape in accordance with an embodiment of the present invention.

In step 413, the designer selects the desired behaviors and their implemented values that are not already provided by the base master specification. In step 414, the designer may choose to override the set of behaviors and/or implemented behavior values of its base master specification. A representative display screen having a window 810 in FIG. 8 illustrates exemplary behaviors that can be selected during the specification phase.

Figure 5:
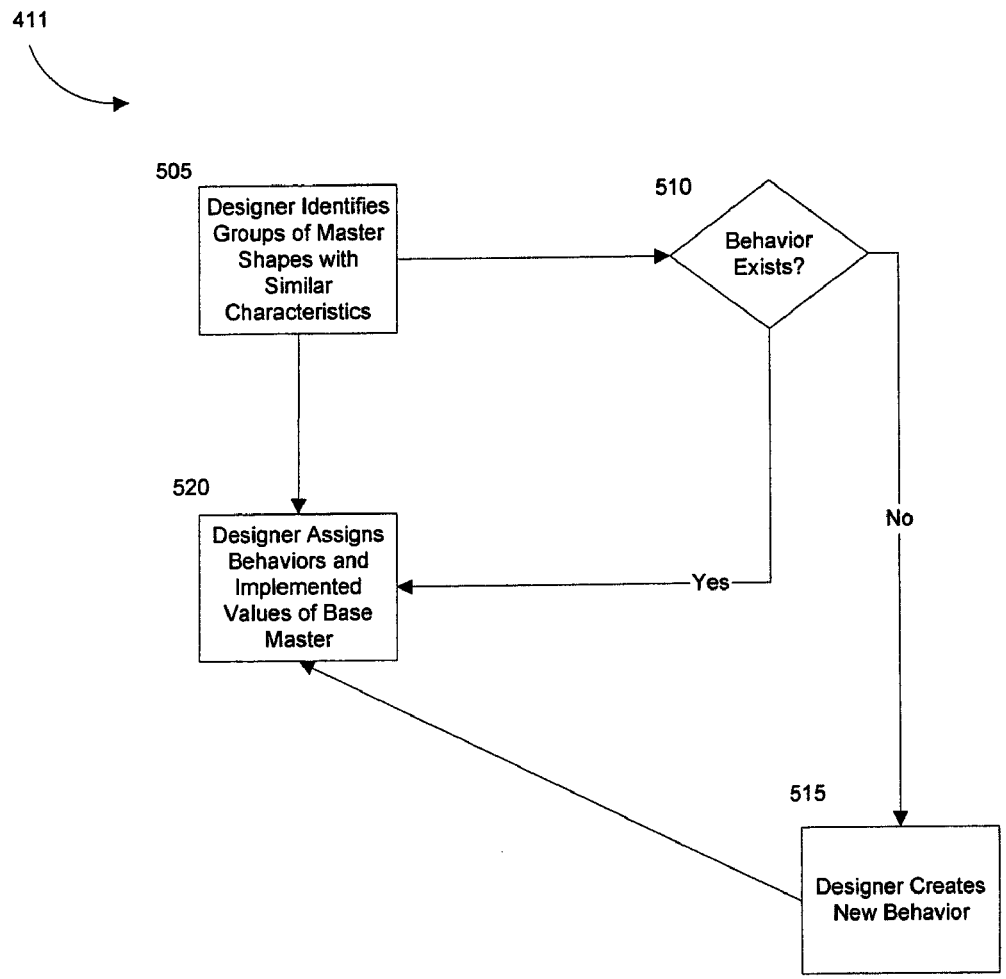
FIG. 5 is a logic flow diagram illustrating an exemplary process for a designer to specify a base master in accordance with an embodiment of the present invention.

Referring to FIG. 5, an exemplary process for the specification of a base master, as referred to in step 411, is illustrated. In step 505, the designer begins by identifying groups of master shapes that have similar characteristics and identifying desired behaviors that constitute these similar characteristics. Many of the behaviors identified by the designer in step 505 may already exist as pre-determined behaviors stored in the database 220. If the desired behavior does not already exist, then the designer may create a new behavior in step 515. New behaviors are created in the same manner as described in connection with step 407. In step 520, the designer selects the desired behaviors and their implemented values for incorporation into the base master specification. All master shapes associated with the base master will inherit the behaviors and implemented values of the base master.

Figure 6:
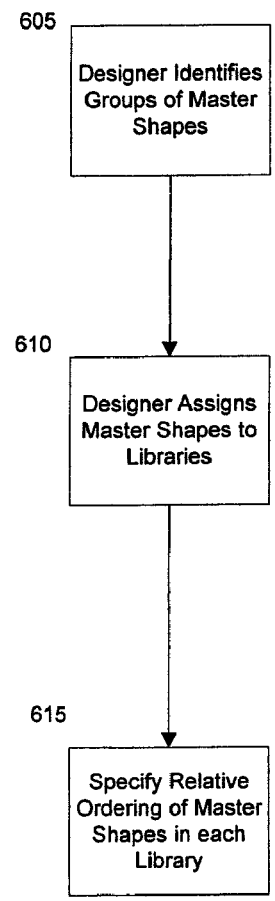
FIG. 6 is a logic flow diagram illustrating an exemplary process for a designer to specify a library of master shapes in accordance with an embodiment of the present invention.
Figure 10:
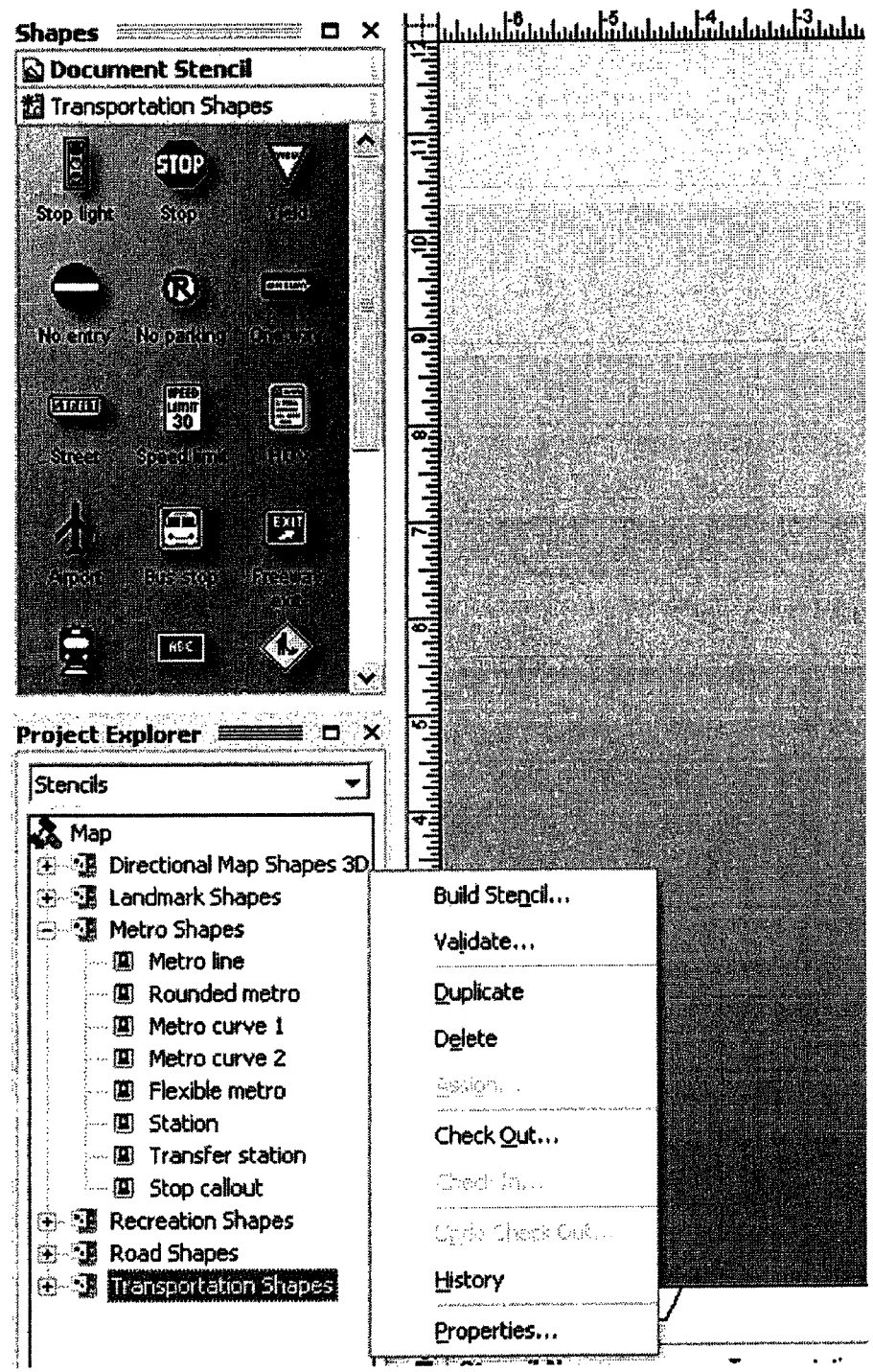
FIG. 10 is a representative display screen illustrating the creation of a stencil for a master shape in accordance with an embodiment of the present invention.

Referring to FIG. 6, an exemplary process for the specification of a library of master shapes as referred to in step 331 is illustrated. The designer begins, in step 605, by identifying groups of master shapes commonly used in a particular field. The group of related master shapes are then assigned to a library in step 610. A library can have a variety of uses, one example being the display of a library of master shapes that a user can refer to when creating a drawing. In step 615, the designer specifies the relative ordering of the master shapes in the library. For example, commonly used shapes may be placed in a more accessible location. Once completed, the specification can be stored in the database 220 for later use in developing the library of master shapes. The representative display screen in FIG. 10 shows the function available for creating a particular type of library, a stencil, or placing a master shape in an existing stencil.

Figure 7A:
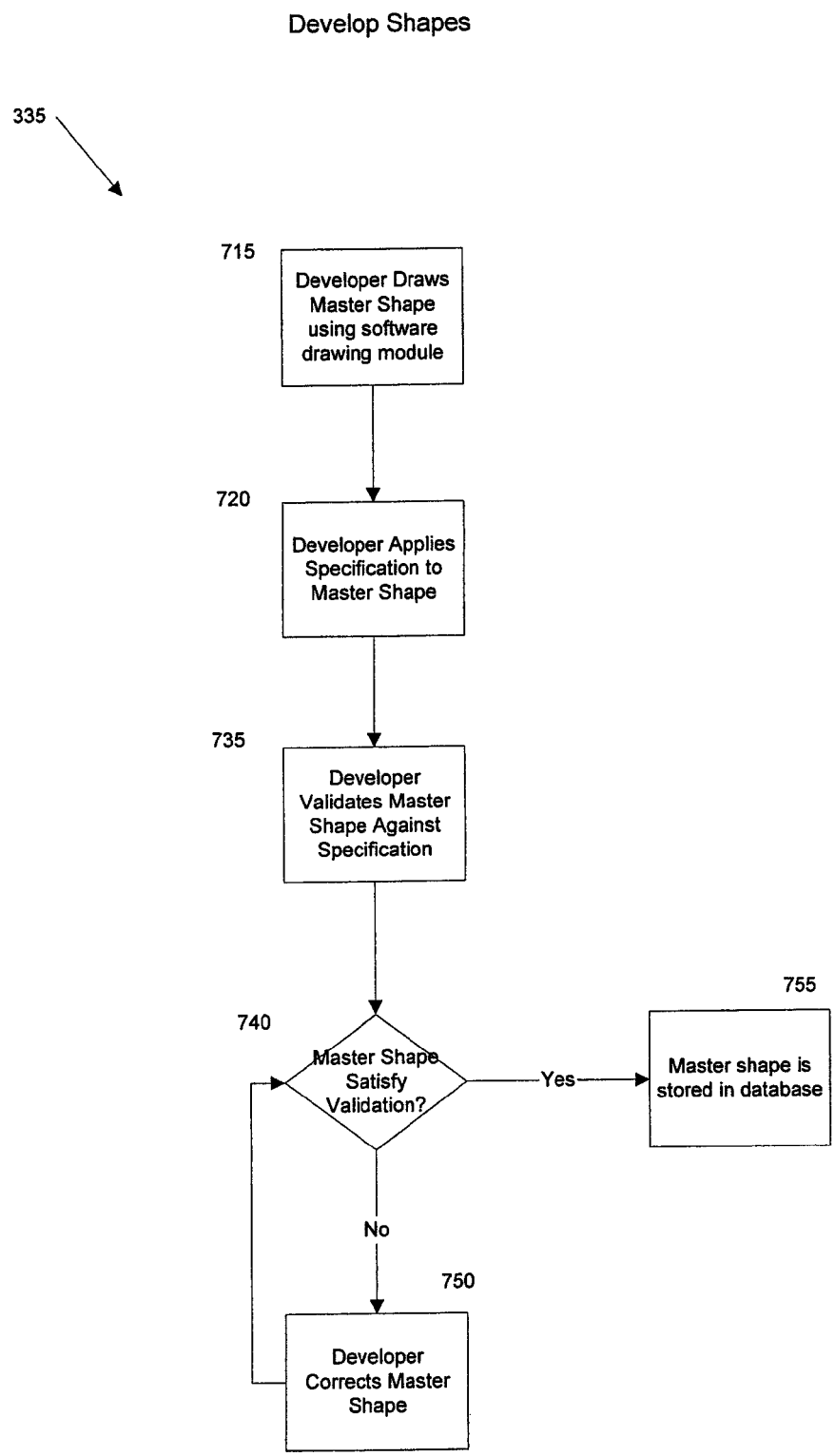
FIG. 7A is a logic flow diagram illustrating an exemplary process for developing a master shape in accordance with an embodiment of the present invention.

An exemplary process 335 for the development of shapes by the design team is illustrated in FIG. 7A. In step 715, the developer creates the master shape using the drawing software module. In the exemplary embodiment described herein, the drawing software module for which shapes are being developed is also the development environment for the shapes. The developer can be the designer or another individual that accesses the database 220 remotely. The process of drawing the master shape in step 715 also can be performed in an automated manner by a computer executable program that is capable of transforming data from an external source of geometry data to the master shape geometry. In step 720, the developer applies behaviors selected during the specification step to the master shape that she has just created. The applied behaviors include master shape behaviors and any base master behaviors that the designer may have specified. Unlike the prior art approach where the developer had to create the master shape's behaviors in the shape sheet 310, shown in FIG. 3A, the preferred implementation of the behaviors are already stored in the database 220. The selected behaviors, as shown in window 810 of FIG. 8, are simply associated with the master shape.

Once the master shape is created, the exemplary embodiment of the present invention also provides a validation function to ensure that the master shape was created correctly. In step 735, the developer compares the master shape against the specification. An exemplary display screen showing results of the validation process is illustrated in FIG. 9. If a particular behavior of the master shape does not conform with the specification, the developer can make the needed corrections in step 750. This process can be repeated until the master shape functions appropriately. Once the master shape is valid, it is stored in the database 220 in step 755.

Figure 7B:
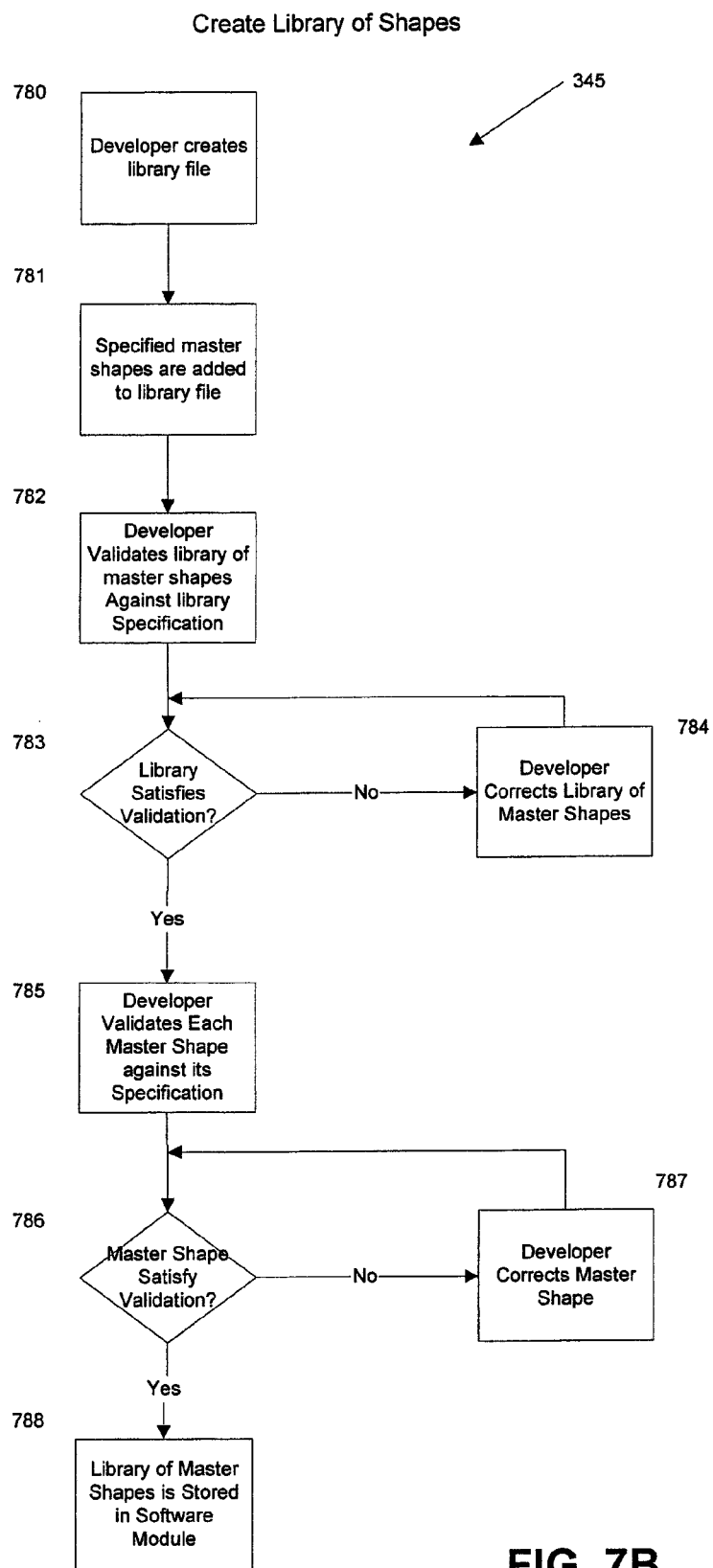
FIG. 7B is a logic flow diagram illustrating an exemplary process for creating a library of shapes in accordance with an embodiment of the present invention.

Referring to FIG. 7B, an exemplary process for the creation of a library of master shapes, as referred to in step 345, is illustrated. The designer begins by creating a library file in step 780, followed by adding the specified master shapes to the file in step 781. In step 782, the library is validated against the library specification created in step 331. If the library is not valid, the developer corrects the errors in step 784. This process is repeated until the library is valid. Once the library is valid then in step 785 each master shape contained in the library is validated against its specification. For each master shape that is not valid, the developer corrects the errors in step 787. This process is repeated until each master shape contained in the library is valid. Once each master shape is valid, in step 788, the library is stored in the drawing software module.

Figure 7C:
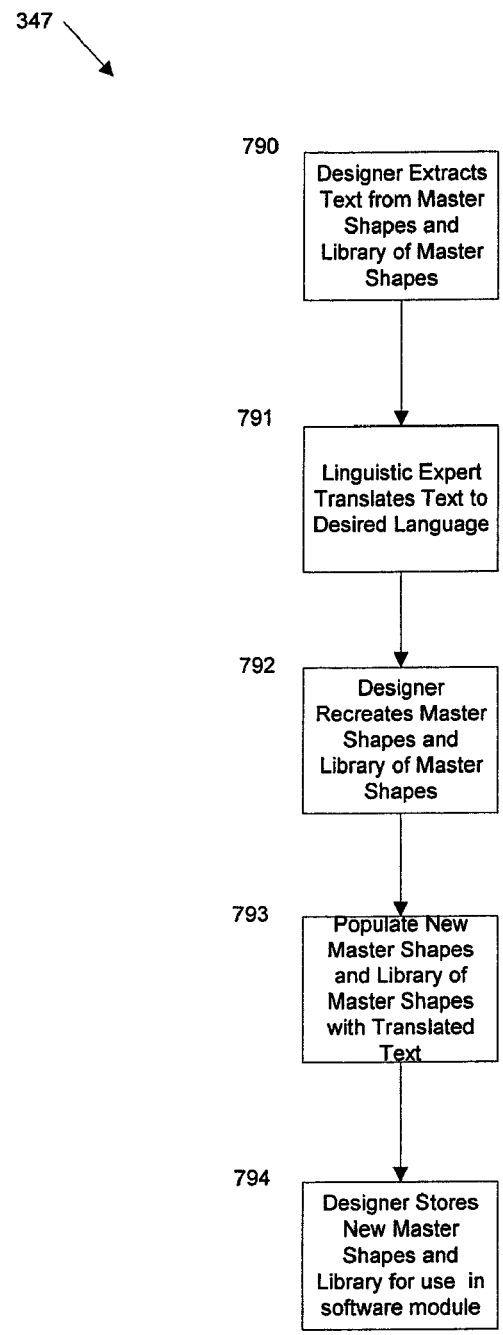
FIG. 7C is a logic flow diagram illustrating an exemplary process for translating master shapes in accordance with an embodiment of the present invention.

Referring to FIG. 7C, an exemplary process for the translation of master shapes and library of master shapes as referred to in step 347 is illustrated. In order for master shapes to be used in different regions of the world the textual components of the master shapes and library of master shapes need to be translated for the desired verbal language. In the prior art approach, illustrated in FIG. 3A, the developer was required to provide the verbal language text during the process of shape development. However, the method described herein improves upon this process by moving the task of translation outside of the development process, such that it can be done by linguistic experts. In step 790, the designer extracts the text from the master shapes and the library of master shapes. Alternatively, the invention can provide an automatic step for performing the extraction. Linguistic experts can translate the extracted text to the desired language in step 791. The master shapes and library of master shapes are then recreated in step 792 and populated with the translated text in step 793. The designer then can store this library of shapes for use in the software drawing module.

In conclusion, the present invention enables and supports a systematic approach to the development of master shapes for a drawing software module. The present invention utilizes the common characteristics among master shapes and stores these as behaviors in their preferred implementation in a database. The behaviors are available to designers and developers for creating new master shapes. Instead of having the same behaviors implemented in varying ways in different master shapes, this method creates a consistency in the design of the master shapes. Creating a uniform platform on which to design master shapes allows for distribution of development tasks among different people. This approach also facilitates the testing and maintenance of master shapes because they can be managed through the stored behaviors as opposed to on an individual basis.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalents thereof. For instance, the sequence of steps for developing master shapes described herein may be more fluid and varying in other embodiments of the invention. Furthermore, the system and method described herein can be applied to developing content for software modules beyond the drawing field, such as other computer-aided design applications.

What is claimed is:

1. A method for maintaining a master shape inventory in a software drawing module, comprising:
   providing a plurality of behavior specifications, wherein a provided behavior specification indicates how appearance or function of a master shape can be manipulated by a user when added to a drawing, a behavior specification defined by creating a computer executable function conforming to a prescribed set of rules;
   after the plurality of behavior specifications are provided, creating a plurality of master shapes by, for each master shape, receiving an association of the master shape to a shape, the shape representing geometry of the master shape;
   receiving an association of the master shape to a provided behavior specification; and
   storing the association to the shape and the association to the provided behavior specification as the master shape in the master shape inventory for use by the user to generate drawings by manipulating the master shape in accordance with the associated behavior specification, the master shapes being grouped in the master shape inventory based on master shapes commonly used in a particular field;
   after creating the plurality of master shapes,
   receiving a modification to a provided behavior specification, the modification indicating a change to the computer executable function conforming to the prescribed set of rules defined for the provided behavior specification; and
   applying the modified behavior specification to a stored master shape associated with that behavior specification for use by the user to generate drawings by manipulating the master shape in accordance with the modified behavior specification wherein the software drawing module, upon receiving from the user a selection of a master shape from the master shape inventory, allows the user to manipulate the shape associated with the master shape in accordance with the behavior specification associated with the master shape by executing the computer executable function conforming to the prescribed set of rules and adds the manipulated shape to a drawing.

2. The method of claim 1, further comprising validating the master shape by comparing it to the modified behavior specification.

3. The method of claim 1, further comprising storing the master shape in a library file for storing shapes.

4. The method of claim 3, further comprising:
   creating the library file; and
   storing the library file with the master shape in the software module.

5. The method of claim 3, further comprising receiving an ordering of master shapes in the library file, wherein the ordering of the shapes is based on frequency of use.

6. The method of claim 1, further comprising:
   transmitting at least one behavior specification from the storage module to a remote client;
   receiving a modified version of the transmitted behavior specification;
   applying the received behavior specification to at least one master shape associated with that behavior specification; and
   storing the master shape.

7. The method of claim 1, further comprising:
   creating a behavior specification for a shape at a remote client;
   receiving the behavior specification of a master shape from the remote client; and
   storing the master shape at a server.

8. The method of claim 1, wherein at least one of the behavior specifications is stored in a prescribed textual format.

9. A computer-readable storage medium comprising instructions for maintaining a master shape inventory in a software drawing module, the software drawing module for distribution to end users, comprising instructions for:
   receiving a plurality of behavior specifications, wherein a received behavior specification indicates how appearance or function of a master shape can be manipulated by a user when added to a drawing, a behavior specification being a computer executable function conforming to a prescribed set of rules;
   receiving associations of shapes to received behavior specifications;
   storing each association as a master shape in the master shape inventory, the master shapes for use by the user to generate drawings by manipulating the master shapes in accordance with the associated behavior specification, wherein different master shapes have associations with the same behavior specification;

receiving a modification to a received behavior specification; and applying the modified behavior specification to a stored master shape associated with that behavior specification, the stored master shape with the modified behavior specification for use by the user to generate drawings by manipulating the master shape in accordance with the modified behavior specification.

10. The computer-readable storage medium of claim 9, further comprising instructions for validating the master shape by comparing it to the modified behavior specification.

11. The computer-readable storage medium of claim 9, further comprising instructions for storing the master shape in a library file for storing shapes.

12. The computer-readable storage medium of claim 11, further comprising instructions for:

creating the library file; and storing the library file with the master shape in the software module.

13. The computer-readable storage medium of claim 11, further comprising instructions for receiving an ordering of master shapes in the library file, wherein the ordering of the shapes is based on frequency of use.

14. The computer-readable storage medium of claim 9, further comprising instructions for:

transmitting at least one behavior specification from the storage module to a remote client;

receiving a modified version of the transmitted behavior specification;

applying the received behavior specification to at least one master shape associated with that behavior specification; and storing the master shape.

15. The computer-readable storage medium of claim 9, further comprising instructions for:

creating a behavior specification for a shape at a remote client;

receiving the behavior specification of a master shape from the remote client; and storing the master shape at a server.

16. The computer-readable storage medium of claim 9, wherein at least one of the behavior specifications is stored in a prescribed textual format.

17. A method for maintaining a master shape inventory in a software drawing module, comprising:

providing a plurality of predetermined behavior specifications for selection by a user, wherein a behavior specification indicates how appearance or function of a shape can be manipulated by a user when the shape is added to a drawing, a behavior specification being a computer executable function conforming to a prescribed set of rules;

receiving a selection of at least one of the predetermined behavior specifications;

receiving an association of a base master shape with the at least one selected behavior specification; and applying the at least one selected behavior specification to a plurality of master shapes associated with the base master shape.

18. The method of claim 17, further comprising:

transmitting the behavior specification to a remote user;

receiving a modified version of the transmitted behavior specification;

applying the received behavior specification to at least one master shape associated with that behavior specification.

* * * * *